United States Patent [19]
Fleming

[11] Patent Number: 5,725,232
[45] Date of Patent: Mar. 10, 1998

[54] TRAILER HITCH GUIDE

[76] Inventor: Thomas R. Fleming, 14020A Maugansville Rd., Maugansville, Md. 21767

[21] Appl. No.: 606,728

[22] Filed: Feb. 27, 1996

[51] Int. Cl.⁶ .................................................. B60D 1/06
[52] U.S. Cl. ...................................... 280/477; 280/511
[58] Field of Search ........................... 280/477, 511, 280/507, 508

[56] References Cited

U.S. PATENT DOCUMENTS

| | | | |
|---|---|---|---|
| 4,417,748 | 11/1983 | Dortch | 280/477 |
| 4,657,275 | 4/1987 | Carroll | 280/477 |
| 4,844,496 | 7/1989 | Webb et al. | |
| 4,854,604 | 8/1989 | Stallsworth | 280/477 |
| 4,871,184 | 10/1989 | Johnson | |
| 4,871,185 | 10/1989 | Chakroff et al. | |
| 5,236,215 | 8/1993 | Wylie | |
| 5,330,196 | 7/1994 | Ricles | |
| 5,549,316 | 8/1996 | Jones | 280/477 |

FOREIGN PATENT DOCUMENTS 2250966  6/1992  United Kingdom.

*Primary Examiner*—Paul N. Dickson
*Attorney, Agent, or Firm*—Stephen R. Greiner

[57] ABSTRACT

A trailer hitch guide for facilitating the connection of articulated land vehicles. The trailer hitch guide includes a V-shaped plate having a pair of angularly diverging arm panels for mounting upon a conventional draw bar in surrounding relation to a hitch ball carried on the draw bar. A pair of resilient pads are secured to the V-shaped plate adjacent the hitch ball with each of the pads being secured, respectively, to one of the arm panels.

15 Claims, 1 Drawing Sheet

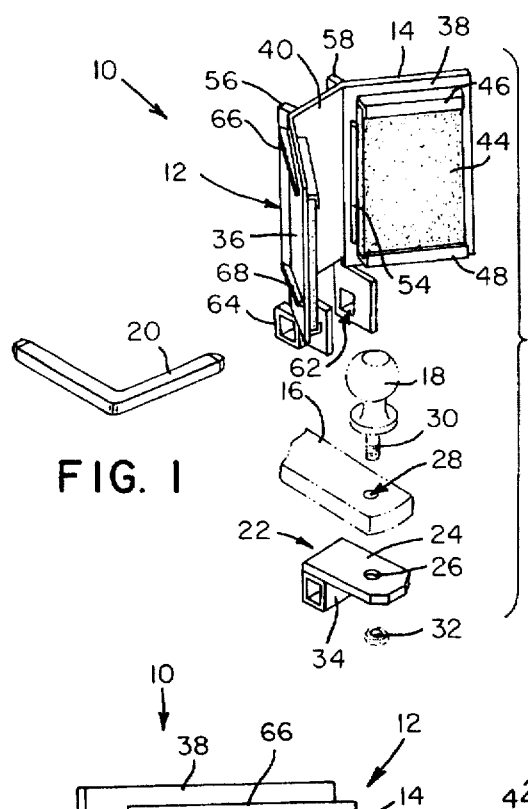
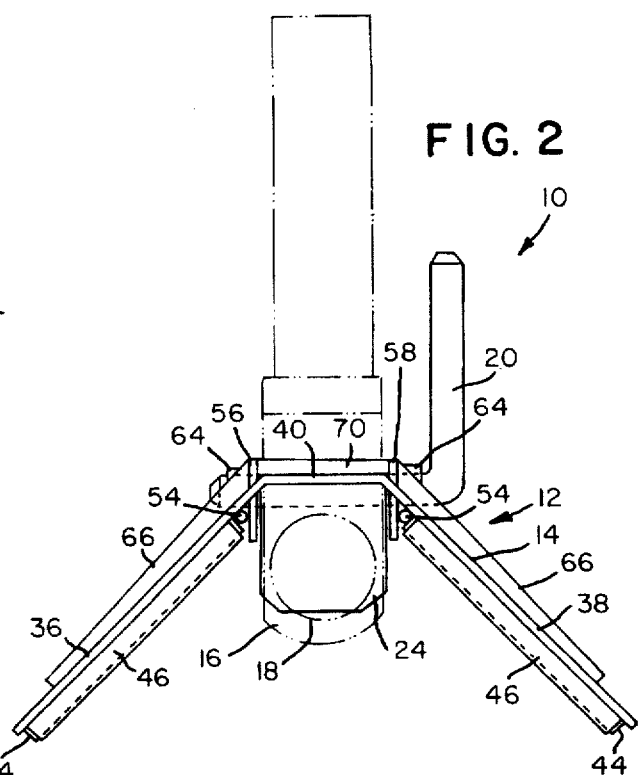
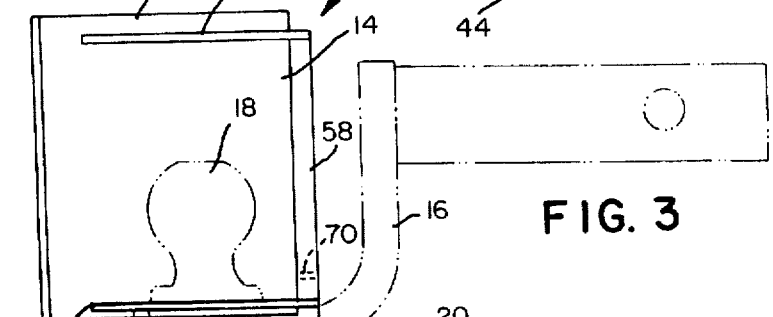
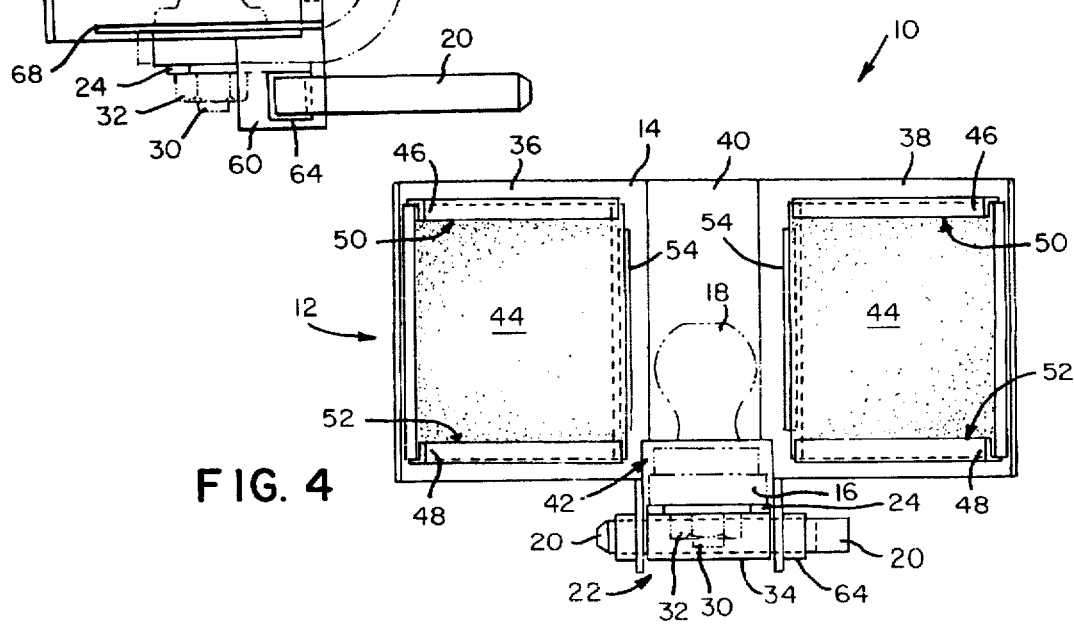

TRAILER HITCH GUIDE

FIELD OF THE INVENTION

The present invention relates generally to articulated land vehicles and, more particularly, to a connection facilitating device therefor.

BACKGROUND OF THE INVENTION

The connection of a towing vehicle to a trailer like those used to transport campers and boats is often difficult. To accomplish such a connection, a hitch ball commonly secured to the rear of a vehicle must be backed toward a trailer to bring the hitch ball into close alignment with the receiving socket in the tongue of the trailer. Since the vehicle driver is unable to view either the trailer tongue or the hitch ball when backing toward the trailer, obtaining proper alignment of the hitch ball and socket is typically a "hit or miss" operation.

Without an observer outside the vehicle offering directions, it is necessary for the driver to exit the vehicle after backing-up a short distance to assess the relative positions of the hitch ball and socket. Prudent drivers, of course, realize that backing into the trailer tongue may result in significant damage to the towing vehicle and proceed slowly. Thus, a significant amount of time is often required for a lone driver to properly position the hitch ball so that the receiving socket may be lowered onto it and the trailer towed away.

Devices have been proposed to assist a lone driver in coupling the hitch ball and trailer socket. Many of these devices have included a V-shaped plate positioned in surrounding relation to the hitch ball for engaging a misaligned trailer socket and funneling it toward the hitch ball. Of these latter devices, several are provided with "quick release" features which permit them to be easily detached from the draw bar after use.

Unfortunately, even the guiding devices having "quick-release" features are not without their drawbacks. Many require significant modification to the towing vehicle, such as by welding additional supports onto the tow bar, in order to attach the device. Such modifications are costly to accomplish and are not easily reversed should use of the guiding device ever become unnecessary. Other guiding devices inconveniently require that the hitch ball be completely removed from the draw bar with a wrench in order to detach them.

Blows received by the prior art devices, upon engagement with a trailer, are typically transmitted to the tow vehicle driver without any dampening. Not only is this an uncomfortable situation, but, when repeated over time, can also result in significant wear to the guiding device. In extreme cases, premature failure of the device could occur. A need exists, therefore, for a trailer hitch guide which is easily detachable from a conventional draw bar and which is capable of absorbing and dissipating impact blows.

SUMMARY OF THE INVENTION

Accordingly, it is a principal object of the invention to provide a trailer hitch guide, for facilitating the connection of articulated land vehicles, that may be easily attached to and detached from a conventional draw bar of a towing vehicle in surrounding relation to a hitch ball carried on the draw bar.

It is another object of the invention to provide a trailer hitch guide of the type described with means for absorbing impact blows received when backing the guide into a trailer tongue with an excessive velocity. Not only will such means for absorbing impacts enhance driver comfort, but will also prevent structural damage to the guide and extend its useful life.

It is an object of the invention to provide improved elements and arrangements thereof in a trailer hitch guide for the purposes described which is inexpensive, dependable and fully effective in accomplishing its intended purposes.

Briefly, the trailer hitch guide in accordance with the present invention achieves its intended objects by featuring a V-shaped plate having a pair of angularly diverging arm panels for mounting upon a conventional draw bar in surrounding relation to a hitch ball carried on the draw bar. A pair of resilient, plastic pads are secured to the V-shaped plate adjacent the hitch ball with each of the pads being secured, respectively, to one of the arm panels.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is an exploded perspective view of a trailer hitch guide in accordance with the present invention.

FIG. 2 is a top view of the trailer hitch guide.

FIG. 3 is a side view thereof.

FIG. 4 is a rear view thereof.

Similar reference characters denote corresponding features consistently throughout the accompanying drawings.

DETAILED DESCRIPTION OF THE PREFERRED EMBODIMENT

Referring now to the FIGS., a trailer hitch guide in accordance with the present invention is shown generally at 10. The guide 10 includes an alignment portion 12 having a V-shaped plate 14 for positioning atop a conventional draw bar 16 in surrounding relation to a hitch ball 18. A key 20, passing through the alignment portion 12 and a retaining portion 22 affixed to the underside of the draw bar 16, selectively locks the alignment portion 12 on the draw bar 16 for use.

The retaining portion 22 of the guide 10 includes an elongated base plate 24 with a planar upper surface for positioning against the underside of the draw bar 16. The rearward end of the base plate 24 is provided with a hole 26 for axial alignment with another hole 28 in the draw bar 16. The threaded mounting stem 30 extending from the bottom of the hitch ball 18 may be passed through the aligned holes 26 and 28. By means of a nut 32 threaded onto the bottom of the mounting stem 30, the hitch ball 18 and base plate 24 may be clamped against the opposite sides of the draw bar 16 as illustrated in FIGS. 2–4.

A channel member 34 is suspended from the forward end of the base plate 24. Preferably, the channel member 34 comprises a length of tubing having a square cross-sectional configuration sized to snugly receive the key 20 which also has a square cross-section. As shown, the longitudinal axis of the channel member 34 is oriented so as to cross the opposite sides of the base plate 24 at substantially right angles.

The V-shaped plate 14 of the alignment portion 12 has rearwardly and outwardly extending arm panels 36 and 38 joined by a medial panel 40. The medial panel 40 has a width approximately the same as that of the draw bar 16. A full-width slot 42 (see FIG. 4) is provided in the bottom of the medial panel 40 so that the guide 10 may be universally secured to draw bars having differing heights. A slot 42 having a depth of 1 inch (2.5 cm) has been determined to be adequate for the purposes described.

Resilient pads 44 are removably secured to the inner surfaces of the arm panels 36 and 38. In the preferred embodiment, each of the pads 44 comprises a sheet of urethane plastic material about 0.375 inches (0.953 cm) thick. Urethane sheet materials are ideal for use in the invention because such are extremely durable, impact resistant and weatherproof. It is contemplated, however, that other materials with similar qualities, such as synthetic rubber, may be readily substituted therefor.

Each of the pads 44 is held in place by a pair of L-shaped flanges 46 and 48 fixedly secured to the inner surface of each arm panel 36 and 38. The upper flanges 46 are secured at their respective upper ends across the tops of the arm panels 36 and 38. The lower ends of the flanges 46 terminate at free ends 50 respectively spaced from the arm panels 36 and 38 a sufficient distance to allow one of the pads 44 to be received therein.

The lower flanges 48, on the other hand, are secured at their respective lower ends across the bottoms of the arm panels 36 and 38. The upper ends of the flanges 48 terminate at free ends 52 respectively spaced from the arm panels 36 and 38 a sufficient distance to allow one of the pads 44 to be received therein. Thus, a user need only slide the pads 44 between the opposed free ends 50 and 52 of the flanges 46 and 48 to secure the pads to the arm panels 36 and 38.

A projection 54 is secured to each of the arm panels 36 and 38 between the flanges 46 and 48 closely adjacent the medial panel 40. As shown, the projections 54 comprise cylindrical rods having a diameter which approximately the same as the thickness of the pads 44. The projections 54 provide stops for the pads 44 and allow the worn pads to be easily replaced.

The V-shaped plate 14 is supported in an upright position by a pair of opposed brace members 56 and 58 secured, respectively, to the exterior surfaces of the arm panels 36 and 38 remote from the hitch ball 18. The brace members 56 and 58 are each provided with an integral extension 60 which projects downwardly beneath the V-shaped plate 14. The overall length of the extension may be varied; however, such must be sufficiently long to permit attachment of the alignment portion 12 to the base portion 22 as described further below.

Openings 62 are provided in the integral extensions 60 which correspond in size, shape and position with those in each end of the channel member 34. Tubular reinforcement sleeves 64 are secured to the outer sides of the extensions 60 about the openings 62. The tubular sleeves 64 have a square cross-sectional configuration identical to that of the channel member 34 for receiving the retaining key 20. Thus, in use, the tubular sleeves 64 effectively widen the brace members 56 and 58 to distribute impact loads to the key 20 over a greater area and reduce the likelihood of either bending or shearing the key.

The V-shaped plate 14 is reinforced by a pair of vertically-spaced spars 66 and 68 secured to the exterior surface of each arm panel 36 and 38. The spars 66 and 68 extend horizontally rearward from the brace members 56 and 58 and generally track the positions of the flanges 46 and 48 on the opposite surfaces of the arm panels 36 and 38. With the spars 66 and 68 secured to the exterior surfaces of the arm panels 36 and 38 and the flanges 46 and 48 secured to the interior surfaces thereof, the V-shaped plate 14 is able to sustain significant impacts during use without permanent deformation occurring.

Should additional reinforcement of the V-shaped plate 14 be desired, one or more stiffeners as at 70 may be secured between the braces 56 and 58. These stiffeners 70 may be formed from steel sheet material having a thickness of 3/16" (0.48 cm) like that preferably used to form the V-shaped plate 14, base plate 24, brace members 56 and 58, and spars 66 and 68. Of course, any other suitable material could be used in fabricating this component or any other in the guide 10.

The guide 10 is removably mounted upon the draw bar 16 for use in four, straight-forward steps. First, the retaining portion 22 is oriented so that the mounting stem 30 of the hitch ball 18 projects through holes 26 and 28. Second, the nut 32 is tightened onto the mounting stem 30 to secure the hitch ball 18 and retaining portion 22 on the draw bar 16. Third, the alignment portion 12 is positioned over the draw bar 16 so that the openings 62 in the braces 56 and 58 are axially aligned with the openings in the channel member 34. Finally, the socket members 64 and channel member 34 are coupled by passing the key 20 into them. The guide 10 is now ready for use in coupling a towing vehicle to a trailer.

After use, the alignment portion 12 may be conveniently stored in an out-of-the-way location. The key 20 is simply withdrawn from the channel and socket members 34 and 64 to uncouple the alignment and retaining portions 12 and 22. The alignment portion 12 is then lifted and removed from the draw bar 16 for storage perhaps in a vehicle trunk. The retaining portion 22 is left in place on the draw bar 16 for ready access at a future time.

While the invention has been described with a high degree of particularity, it will be appreciated by those skilled in the art that numerous modifications and substitutions may be made thereto. For example, the means for securing the resilient pads to the V-shaped plate may include any suitable type of mechanical or chemical fastener. Additionally, the configuration of the retaining key and the elements which receive such may have any geometric shape that limits their relative rotation after assembly. Therefore, it is to be understood that the present invention is not limited to the sole embodiment described above, but encompasses any and all embodiments within the scope of the following claims.

I claim:

1. A trailer hitch guide, comprising:
   a V-shaped plate having a pair of angularly diverging arm panels adapted for mounting upon a draw bar in surrounding relation to a hitch ball carried on the draw bar;
   a pair of resilient pads, each of said pads being, respectively, secured to one of said arm panels; and,
   at least one pair of cooperating, L-shaped flanges affixed one above the other to one of said arm panels for slidably receiving one of said resilient pads therebetween.

2. The trailer hitch guide according to claim 1 wherein each of said resilient pads comprises a urethane sheet.

3. The trailer hitch guide according to claim 1 further comprising a projection extending from one of said arm panels between said cooperating, L-shaped flanges for engaging, and preventing the lateral movement of, one of said resilient pads during use of said guide.

4. The trailer hitch guide according to claim 1 further comprising a pair of laterally-spaced braces extending downwardly from said V-shaped plate and adapted to closely receive the draw bar therebetween, said braces having opposing apertures adapted to receive therebetween a removable key for securing said trailer hitch guide to the draw bar.

5. The trailer hitch guide according to claim 4 further comprising a pair of socket members, each of said socket members having an opening with a cross-sectional configuration substantially identical to that of said opposing apertures in said braces, each of said socket members being secured, respectively, at an end to one of said braces in alignment with one of said apertures.

6. The trailer hitch guide according to claim 4 further comprising:
   a retaining portion adapted for attachment to the draw bar and having a lateral passageway for alignment with said opposing apertures in said braces; and,
   a key removably positionable in said opposing apertures in said braces and said lateral passageway for releasably securing said V-shaped plate to said retaining portion.

7. The trailer hitch guide according to claim 6 wherein said retaining portion includes:
   a base plate adapted to be secured to the draw bar; and,
   a tubular channel member secured to said base plate.

8. A trailer hitch guide for use on a draw bar with a hole through the draw bar, a hitch ball connected to the draw bar by a threaded rod extending from the hitch ball through the draw bar hole, and a nut threadably secured to a free end of the threaded rod, the trailer hitch guide comprising:
   a retaining portion having a hole for alignment with the draw bar hole for passage of the free end of the threaded rod so as to permit said retaining portion to be clamped between the draw bar and the nut, said retaining portion further having a lateral passageway remote from said hole;
   an alignment portion having a V-shaped plate with a pair of angularly diverging arm panels adapted for positioning in surrounding relation to the hitch ball carried on the draw bar, said alignment portion further having a pair of laterally-spaced braces extending downwardly from said V-shaped plate so as to receive the draw bar and retaining portion therebetween, said braces having opposing holes positioned for axial alignment with ends of said lateral passageway; and,
   a key removably positioned in said opposing holes in said braces and said lateral passageway when axially aligned for releasably securing said alignment portion to said retaining portion.

9. The trailer hitch guide according to claim 8 further comprising a pair of socket members, each of said socket members having an opening with a cross-sectional configuration substantially identical to that of said opposing apertures in said braces, each of said socket members being secured, respectively, at an end to one of said braces in alignment with one of said apertures.

10. The trailer hitch guide according to claim 8 wherein said retaining portion includes:
    a base plate having an upper surface for positioning against the draw bar and a lower surface spaced therefrom, said hole for passage of the free end of the threaded rod connecting said upper and lower surfaces; and,
    a tubular channel member secured to said lower surface of said base plate, said channel member having open ends with said lateral passageway connecting said open ends.

11. The trailer hitch guide according to claim 8 further comprising a pair of resilient pads, each of said pads being respectively secured to one of said arm panels so as to be positionable adjacent the hitch ball.

12. The trailer hitch guide according to claim 11 wherein each of said resilient pads comprises a urethane sheet.

13. The trailer hitch guide according to claim 11 further comprising at least one pair of cooperating, L-shaped flanges affixed one above the other to one of said arm panels for slidably receiving one of said resilient pads therebetween.

14. The trailer hitch guide according to claim 13 further comprising a projection extending from one of said arm panels between said cooperating, L-shaped flanges for engaging, and preventing lateral movement of, one of said resilient pads during use of said guide.

15. A trailer hitch guide for use on a draw bar with a hole through the draw bar, a hitch ball connected to the draw bar by a threaded rod extending from the hitch ball through the draw bar hole, and a nut threadably secured to a free end of the threaded rod, the trailer hitch guide comprising:
    a retaining portion having a hole for alignment with the draw bar hole for passage of the free end of the threaded rod so as to permit said retaining portion to be clamped between the draw bar and the nut, said retaining portion also having a lateral passageway remote from said hole;
    an alignment portion having a V-shaped plate with a pair of angularly diverging arm panels adapted for positioning in surrounding relation to the hitch ball carried on the draw bar, said alignment portion further having a pair of laterally-spaced braces extending downwardly from said V-shaped plate so as to receive the draw bar and retaining portion therebetween, said braces having opposing holes positioned for alignment with ends of said lateral passageway;
    a pair of resilient plastic pads, each removably secured to one of said arm panels; and,
    a key removably positioned in said opposing holes in said braces and in said lateral passageway for releasably securing said alignment portion to said retaining portion.

\* \* \* \* \*